Feb. 5, 1924.
R. B. BENJAMIN
SIGNAL DEVICE FOR AUTOMOBILES
Filed June 18, 1917
2 Sheets-Sheet 1
1,482,540
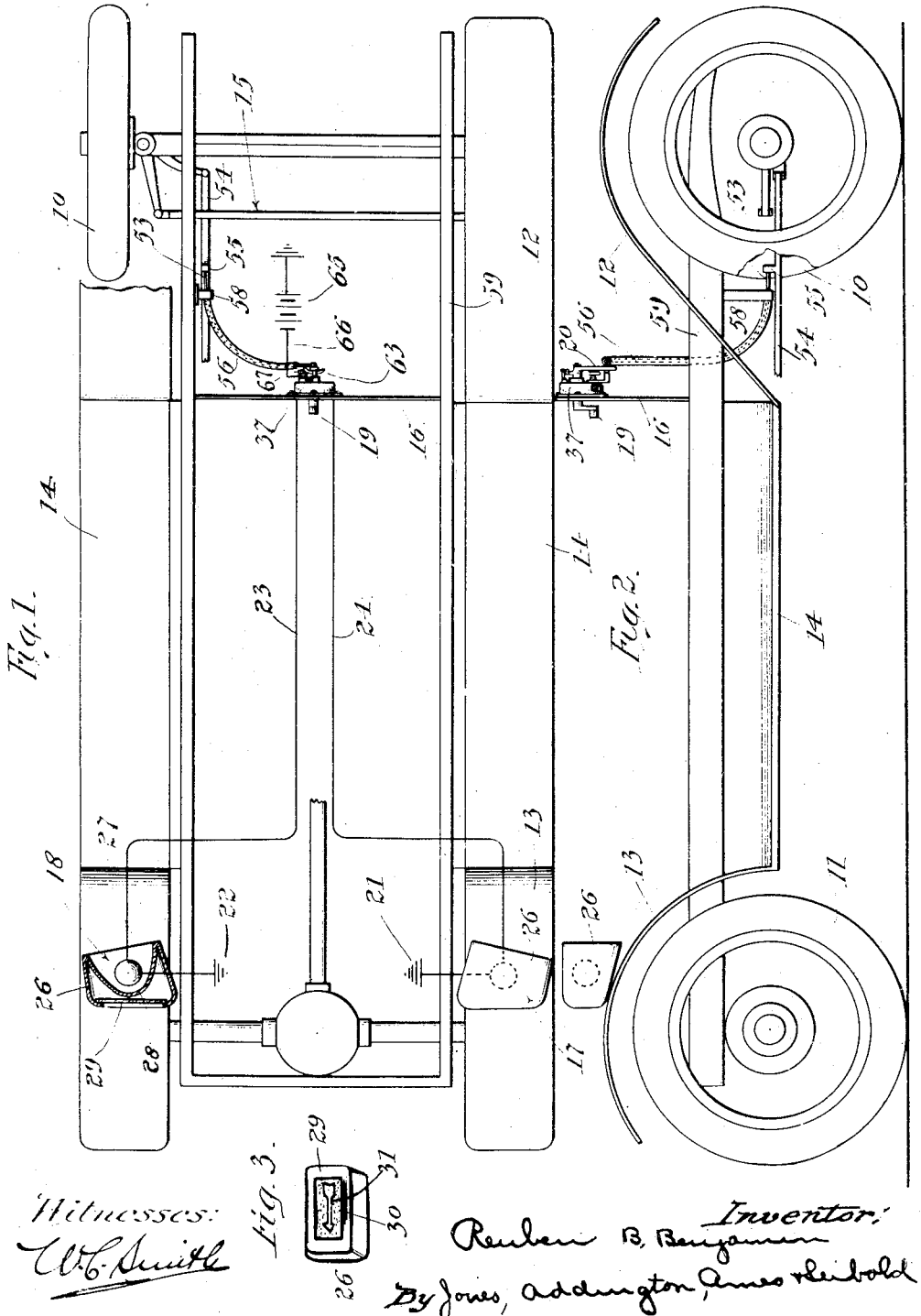

Feb. 5, 1924.

R. B. BENJAMIN

SIGNAL DEVICE FOR AUTOMOBILES

Filed June 18, 1917  2 Sheets-Sheet 2

Witnesses:
W. C. Smith

Inventor:
Reuben B. Benjamin
By Jones, Addington, Ames & Seibold
Attys

Patented Feb. 5, 1924.

1,482,540

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

SIGNAL DEVICE FOR AUTOMOBILES.

Application filed June 18, 1917. Serial No. 175,514.

*To all whom it may concern:*

Be it known that I, REUBEN B. BENJAMIN, a citizen of the United States, residing at Chicago, in the county of Cook and State of Illinois, have invented new and useful Improvements in Signal Devices for Automobiles, of which the following is a full, clear, concise, and exact description, reference being had to the accompanying drawings, forming a part of this specification.

My invention relates to signal devices for automobiles.

One of the objects of my invention is to provide such a device which will be practical in construction and efficient in use. Further objects will appear from the detailed description to follow and from the appended claims.

In the drawings, in which one embodiment of my invention is shown—

Figure 1 is a plan view of parts of an automobile showing my invention in connection therewith;

Fig. 2 is a side elevation of Fig. 1;

Fig. 3 is a rear elevation of one of the signal-lamps;

Figure 4:
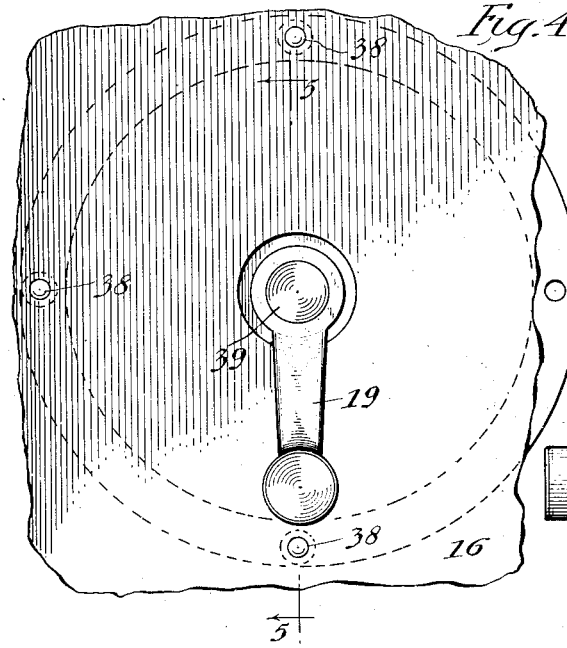
Fig. 4 is an elevation of a switch-mechanism employed.
Figure 5:
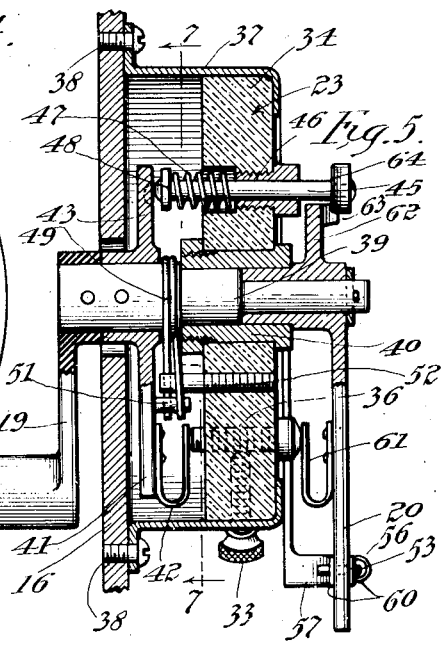
Fig. 5 is a vertical section on the line 5—5 of Fig. 4.

Referring to the drawings in detail, my invention is shown in connection with an automobile comprising front and rear wheels 10 and 11, respectively, front and rear fenders 12 and 13, respectively, running-boards 14, the steering gear 15, and the dash 16.

Mounted on the rear fenders 13 are right and left-hand signal-lamps 17 and 18, respectively, constructed so that the light will be visible both from the front and the rear, and so that a forward-directed light will illuminate the running-boards 14 to facilitate getting into and out of the automobile. The signal lamps also serve to provide increased illumination when a turn is being made, on the side of the automobile towards which the turn is being made. The lighting of the signal-lamps 17 and 18 may be manually controlled by means of a manually-operated switch-lever 19, or may be automatically controlled from the steering gear of the vehicle by means of the switch-arm 20. The construction is such that the driver can light either one of the signal-lamps 17 or 18 when he intends to make a turn, to indicate the direction in which he intends to turn. The construction is also such that the switch-lever 19 will be automatically latched when it is moved into position to cause the lighting of either of the lamps 17 or 18. The construction is also such that the turning of the automobile to right or left will automatically cause the right or left-hand lamp to be lit, and will automatically release the latch which holds the switch-lever 19, in case this has already been operated to light one of the lamps.

The lamps 17 and 18 each have one terminal connected with grounds 21 and 22, respectively, and the other terminals connected with the switch 23 or the dash 16 by means of conductors 24 and 25, respectively (Fig. 1). Each of the lamps 17 and 18 comprises an outside casing 26, a reflector 27 mounted in this casing and having an opening 28 in the rear thereof, and a glass plate 29 mounted across an opening 30 in the rear of the casing 26 in position to be illuminated by the light through the opening 28. The glass plate 29 may be provided with suitable indicating means, such as the arrow 31, for indicating the direction of the turning of the vehicle, as shown in Fig. 3. The shield of the glass plate 29 may be ground glass and the arrow itself may be translucent red glass.

The mechanism for controlling the lamps 17 and 18 is shown in detail in Figs. 4, 5, 6 and 7. The conductors 24 and 25 are connected to binding-terminals 32 and 33, respectively (Fig. 6) mounted on the insulating base 34 of the switch 23 and electrically connected with the double contacts 35 and 36, respectively, of the switch 23. The insulating base 34 of the switch may be enclosed in a suitable casing 37 secured to the dash 16 by means of screws 38.

The manually-operated switch-mechanism comprises a shaft or pin 39 rotatably mounted in the bearing-sleeve 40 supported by the insulating base 34, a switch-arm 41 secured to the shaft 39 and carrying a U-shaped spring contact 42 for engagement with the fixed contacts 35 and 36, and the switch-arm 19 secured to the shaft 39 for operating it.

For latching the spring contact in engagement with either of the contacts 35 or 36, the switch-arm 41 is provided with an extension 43 having a pair of depressions 44 for the reception of the end or point of the latching-bolt or pin 45. This latch-bolt 45 is slidably mounted in a bearing-sleeve 46 supported by the insulating base 34 and is spring-pressed against the extension 43 by means of a coil-spring 47 surrounding the bolt 45 and bearing on the shoulder 48 with which the latch-bolt 45 is provided. The location of the depressions 44 is such that when the end of the latch-bolt 45 engages them the spring contact 42 will be in engagement with one or the other of the fixed contacts 35, 36.

For returning the switch-arm 41 when the latch-bolt 45 is released to a position in which the contact 42 will be out of engagement with both of the contacts 35 and 36, a spring 49 is provided having a portion coiled around the shaft 39 and having its free end portions 50 extending on opposite sides of an abutment 51 on the switch-arm 41, and also on opposite sides of an abutment 52 supported by the insulating base 34.

For controlling the lighting of the lamps 17 and 18 from the steering gear, a flexible wire 53 is connected at one end to the switch-arm 20 and at the other end to the reach-rod 54 of the steering gear, as indicated at 55 (Figs. 1 and 2).

Figure 6:
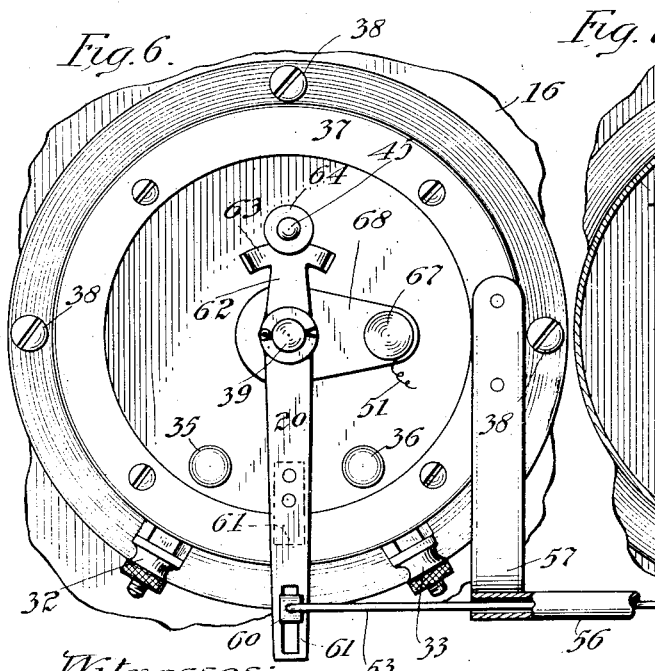
Fig. 6 is an elevation of the opposite side of the switch-mechanism shown in Fig. 4.
Figure 7:
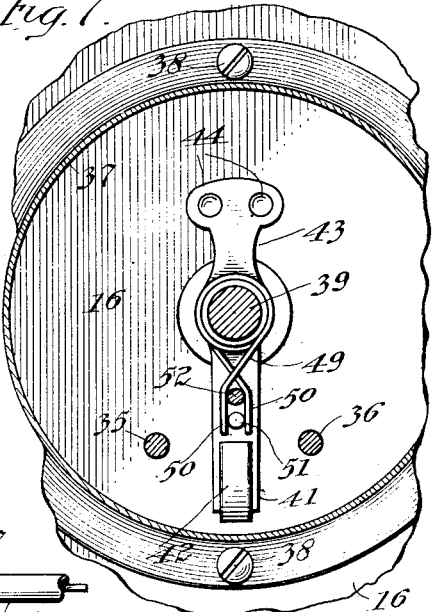
Fig. 7 is a section on the line 7—7 of Fig. 5.

A suitable sheath 56 may be provided for the sliding operation of the flexible wire 53. This sheath may be supported in any suitable manner, as by brackets 57 and 58 supported by the switch 23 and frame 59 of the automobile, respectively. The end of the flexible wire 53 is pivotally connected to a block 60 of insulating material, which is slidably mounted in a slot 61 in the switch-arm 20 (Fig. 6). The switch-arm 20 carries a U-shaped spring contact 61, which is movable into engagement with either one of the fixed contacts 35, 36.

For operating the latch-pin or bolt 45 to release the switch-arm 41 the switch-arm 20 is provided with an extension 62 (Figs. 1, 4 and 6) which carries an arcuate cam 63 adapted to engage with a shoulder 64 on the latch-pin 45 to withdraw the latch-pin from the depressions 44 when the switch-arm 20 is moved to bring the contact 61 into engagement with either one of the fixed contacts 35, 36.

The operation of the signal device is as follows: If the driver of the automobile is about to turn to the right, he swings the switch-lever 19 to a position in which the spring contact 42 engages the fixed contact 35. This causes the right-hand lamp 17 to be lit, the circuit being from the battery or source of supply 65, through the conductor 66, binding-terminal 67, extension 68, sleeve 40, shaft 39, switch-arm 41, spring contact 42, fixed contact 35, binding-terminal 32, conductor 24, and lamp 17 to the ground 21. Similarly, if the driver is about to turn to the left, he swings the switch-arm 19 to the left to a position in which the spring contact 42 engages the fixed contact 35 causing the left-hand lamp 18 to be lit, the circuit in this case being from the spring contact 42 through the fixed contact 36, binding-terminal 33, conductor 25, and lamp 18 to the ground 22.

The latch-bolt 45 will hold the switch-arm 41 with the contact 42 in engagement with the fixed contact until it is released by forcibly moving the switch-lever 19 to cause the latch-bolt to be retracted, or until it is released by the cam 63 operated by the steering gear.

Assuming that the driver is about to turn and has moved the switch-lever 19 to a position in which the right-hand lamp 17 is lit, and then proceeds to turn the vehicle, the switch-arm 20 will be caused to move to bring the contact 61 into engagement with the fixed contact 35 and the cam 63 will be operated to withdraw the latch-bolt 45 to permit the spring 49 to return the switch-arm 41 to a position in which the contact 42 is not in engagement with either of the fixed contacts 35, 36.

As soon as the turn has been completed and the automobile is proceeding on a straight course, the switch-arm 20 will be moved to a position in which the spring contact 61 is not in engagement with either of the fixed contacts 35, 36, so that neither of the lights 17, 18 will be lit.

In case the driver inadvertently or otherwise fails to operate the switch-lever 19 before making a turn, the proper signal-lamp 17 or 18 will nevertheless be lit, since the shifting of the steering gear will shift the switch-arm 20 to make the proper contact.

Since the lights in the lamps 17 and 18 are visible both from the front and the rear, the signals serve as an indication both to those in the rear and to those in front as to the direction in which the automobile is to be turned. These lamps 17 and 18 also facilitate getting into and out of the automobile at night, as they illuminate the running-board and the sides of the body, enabling one to tell where to step and to locate the latching mechanism for the doors, etc. The lamps 17 and 18 also serve as turning lamps, as they automatically provide increased illumination on the side of the automobile to which a turn is being made, thus lighting up the roadway at night in the direction of turning.

The battery 65 is connected by means of the conductor 69 with the ground 70,

What I claim as new and desire to secure by Letters Patent of the United States is:

1. The combination with an automobile having a steering gear, of two electric lights one on each side of the automobile for indicating the turning movement thereof, manually-controlled switch means for selectively controlling the lighting of said lights to indicate either right or left-hand turning, releasable means for causing the light lighted to remain lit, and means controlled by said steering gear for controlling said switch means and for releasing said releasable means.

2. The combination with an automobile having a steering gear, of two electric lights one on each side of said automobile for indicating the turning movement thereof, manually-controlled switch means for selectively lighting said lights to indicate either right or left-hand turning, releasable means for retaining said switch means in position to cause the selected light to remain lit, means for releasing said releasable means, and means for returning said switch means to a position in which neither of the lights is caused to be lit, said switch means comprising a shaft, a movable contact-arm rotatable about the axis of said shaft, two fixed contacts co-operating with said movable arm, said arm having abutment means thereon, said returning means comprising a spring embracing said shaft and having two free ends extending on opposite sides of said abutment means, and fixed abutment means extending between said free ends.

3. The combination with an automobile having a steering gear, of two electric lights, one for each side of the automobile for indicating the turning movement thereof, means including a manually operable switch-arm for causing the lighting of said lights to indicate either right or left hand turning, releasable means for alternatively holding said arm in either of its "on" positions, means including a second switch-arm controlled by said steering gear for alternatively lighting said lights to indicate the direction of turning and means controlled by said steering gear for releasing said releasable means.

4. The combination with an automobile having a steering gear, of two electric lights, one for each side of the automobile for indicating the turning movement thereof, means including a manually operable switch-arm for causing the lighting of said lights, to indicate either right or left hand turning, releasable means for alternatively holding said arm in either of its "on" positions, means including a second switch-arm controlled by said steering gear for alternatively lighting said lights to indicate the direction of turning and means controlled by said steering gear for releasing said releasable means, said switch-arms being co-axially mounted.

5. An operating mechanism for direction indicators for use on automobiles comprising an actuating member adapted to be moved in opposite directions for causing the required signal to be displayed, spring-pressed means for retaining said actuating member in neutral position, a latch device for retaining said actuating member in operative position and means movable with the steering mechanism of the automobile to release said latch device.

6. An operating mechanism for direction indicators for use on automobiles comprising an actuating member movable in opposite directions for causing the required signal to be displayed, spring-pressed means for retaining said actuating member in neutral position and a latch device for retaining the actuating member in operative position.

7. The combination with an automobile, of a lighting and signalling construction, comprising means whereby when the automobile is turned to the right or left, a right or left hand turning signal, visible from the rear, will be displayed, and the illumination on the side towards which the automobile is being turned will be increased to light up the roadway on that side.

8. The combination with an automobile, of a lighting and signalling construction, comprising right and left hand signalling means visible from the rear, and means whereby when one or the other of said signalling means is displayed, the illumination on the corresponding side will be increased to light up the roadway to facilitate turning.

9. The combination with an automobile, of a lighting and signalling construction, comprising right and left hand signalling means visible from the rear, and means whereby when one or the other of said signalling means is displayed, the illumination on the corresponding side will be increased to light up the roadway to facilitate turning, said means comprising a pair of lamps, one of each side of the automobile, and a pair of reflectors, one for each lamp, for directing the rays of light forwardly for illuminating purposes, each of said reflectors having an opening in the rear, to permit rearwardly directed rays for signalling purposes.

10. The combination with an automobile having a steering gear, of right and left hand electrically controlled signalling means, and means for controlling said signalling means comprising a manually operable switch arm, and a switch arm controlled by the steering gear, co-axial with said first switch arm.

11. The combination with an automobile having a steering gear, of right and left hand electrically controlled signalling means, and means for controlling said signalling means comprising a switch base, a manually operable switch arm mounted on one side of said switch base, and a switch arm controlled by the steering gear mounted on the other side of the switch base, and co-axial with said first switch arm.

12. A switch mechanism for automatically and manually controlling the right and left hand signalling means of an automobile, comprising a switch base, a manually operable switch arm on one side of said switch base, and an automatically operable switch arm on the other side of said switch base co-axial with first switch arm.

13. A switch mechanism for manually and automatically controlling the right and left hand signalling means for an automobile, comprising an insulating base, a manually operable switch arm, mounted on one side of said insulating base, an automatically operable switch arm mounted on the other side of said insulating base, and co-axial with said first switch arm, and a latch pin operable by said automatically operable switch and extending through said base for controlling said manually operable switch arm.

14. A switch mechanism for automatically and manually controlling the right and left hand signalling means of an automobile, comprising a switch base, a manually operable switch arm mounted on one side of said switch base, an automatically operable switch arm controlled by the steering mechanism mounted on the other side of said switch base, co-axial with said first switch arm and contact members extending through said switch base and cooperating with both of said switch arms.

In witness whereof, I have hereunto subscribed my name.

REUBEN B. BENJAMIN.